(12) United States Patent
Webber et al.

(10) Patent No.: US 10,711,407 B2
(45) Date of Patent: Jul. 14, 2020

(54) ENGINEERED MATERIAL ARRESTOR SYSTEM

(71) Applicants: Daniel Webber, Jersey City, NJ (US); Jami Bjornstad, Edison, NJ (US); Casimir Joseph Bognacki, New Hyde Park, NY (US); Joseph Marsano, West Caldwell, NJ (US); Patel Nisraiyya, Scotch Plains, NJ (US); Geoffrey Frank, Dayton, OH (US); Matthew Barsotti, Austin, TX (US); Kevin B. Bleach, New Providence, NJ (US)

(72) Inventors: Daniel Webber, Jersey City, NJ (US); Jami Bjornstad, Edison, NJ (US); Casimir Joseph Bognacki, New Hyde Park, NY (US); Joseph Marsano, West Caldwell, NJ (US); Patel Nisraiyya, Scotch Plains, NJ (US); Geoffrey Frank, Dayton, OH (US); Matthew Barsotti, Austin, TX (US); Kevin B. Bleach, New Providence, NJ (US)

(73) Assignee: The Port Authority of New York and New Jersey, New York, NY (US)

( * ) Notice: Subject to any disclaimer, the term of this patent is extended or adjusted under 35 U.S.C. 154(b) by 229 days.

(21) Appl. No.: 15/179,033

(22) Filed: Jun. 10, 2016

(65) Prior Publication Data

US 2017/0356137 A1   Dec. 14, 2017

(51) Int. Cl.
*E01C 1/00* (2006.01)
*E01C 9/00* (2006.01)
*B64F 1/02* (2006.01)

(52) U.S. Cl.
CPC ............. *E01C 9/007* (2013.01); *B64F 1/025* (2013.01)

(58) Field of Classification Search
CPC .. B64F 1/025; B64F 1/00; E01C 9/007; E01C 9/00; E01C 3/003; E01C 2201/10; E01C 7/142
See application file for complete search history.

(56) References Cited

U.S. PATENT DOCUMENTS 3,651,983 A * 3/1972 Haugen ................ B65D 43/162
206/815
5,011,326 A * 4/1991 Carney, III ........... E01F 15/146
404/6

(Continued)

OTHER PUBLICATIONS

ACRP, 'Developing Improved Civil Aircraft Arresting Systems', (Year: 2009).*

(Continued)

*Primary Examiner* — Assres H Woldemaryam
(74) *Attorney, Agent, or Firm* — Fenwick & West LLP

(57) ABSTRACT

An aircraft arrestor system which provides a controllable deceleration force for an aircraft during an overrun event is disclosed. The arrestor systems arrest aircraft movement by creating a controllable deceleration force or drag force on the aircraft's landing gear. The aircraft arrestor system comprises an arresting medium which is contained by a plurality of adjacent containment cells. The arresting medium comprises smooth and rounded expanded glass particles which are loose and unbroken. The particles also have a controlled size range of about 0.04 inches to about 0.75 inches, and at least about 75% of the particles have a minimum size which is not less than about ¼ of the size of the largest particles.

15 Claims, 11 Drawing Sheets

(56) References Cited

U.S. PATENT DOCUMENTS

| | | | |
|---|---|---|---|
| 5,885,025 A | 3/1999 | Angley et al. | |
| 6,685,387 B2 | 2/2004 | Allen et al. | |
| 6,726,400 B1 | 4/2004 | Angley et al. | |
| 6,969,213 B2 | 11/2005 | Rastegar et al. | |
| 6,971,817 B2 | 12/2005 | Allen et al. | |
| 7,000,279 B2* | 2/2006 | Szekely | E01C 11/24 14/69.5 |
| 7,261,490 B2 | 8/2007 | Allen et al. | |
| 7,303,800 B2* | 12/2007 | Rogers | B32B 3/02 428/44 |
| 7,597,502 B2 | 10/2009 | Allen et al. | |
| 8,021,074 B2 | 9/2011 | Valentini et al. | |
| 8,579,542 B2 | 11/2013 | Narmo | |
| 9,802,717 B2 | 10/2017 | Valentini et al. | |
| 10,196,156 B2 | 2/2019 | Valentini et al. | |
| 2004/0165950 A1* | 8/2004 | Rastegar | E01C 9/007 404/71 |
| 2009/0101553 A1* | 4/2009 | Lucas | E03F 1/00 210/164 |
| 2010/0254762 A1* | 10/2010 | Valentini | B64F 1/025 404/34 |
| 2013/0020437 A1* | 1/2013 | Valentini | B64F 1/025 244/110 R |
| 2013/0341226 A1* | 12/2013 | deHaan | A01G 9/00 206/423 |
| 2015/0247298 A1* | 9/2015 | Li | E01C 9/007 428/116 |
| 2016/0176544 A1* | 6/2016 | Valentini | B64F 1/025 428/316.6 |

OTHER PUBLICATIONS

Federal Aviation Administration, "Advisory Circular: Engineered Materials Arresting Systems (EMAS) for Aircraft Overruns," Sep. 27, 2012, pp. 1-22.

* cited by examiner

ENGINEERED MATERIAL ARRESTOR SYSTEM

FIELD OF THE INVENTION

The present invention is directed to the field of engineered materials. More specifically, the present invention is directed to aircraft arrestor systems and methods of their use and construction.

BACKGROUND OF THE INVENTION

The Federal Aviation Administration (FAA) requires that commercial airports have a standard runway safety area (RSA) where possible. The RSA is the area surrounding the runway specially prepared or suitable for reducing the risk of damage to airplanes in the event of an undershoot, overshoot, or excursion from the runway. At most commercial airports, the standard RSA is 500 feet wide and extends 1,000 feet beyond each end of the runway. Since many airports were built before the 1,000-foot extension requirement was mandated over 20 years ago, the area beyond the end of the runway is where many airports cannot achieve the full standard runway safety area.

Recognizing the need for increased airport safety within the practical constraints of the land available around many airports, research programs were designed to develop technologies to safely stop an aircraft during an overrun event using less than the standard 1000 foot runway safety area. The culmination of the research in soft ground arresting systems has been the implementation of Engineered Material Arresting Systems (EMAS) at numerous airports. As of February 2014, at least 74 EMAS had been installed at 47 airports throughout the U.S.

EMAS are used at airports where the 1000 foot RSA's cannot be met due to the presence of bodies of water, local development, or other obstacles. EMAS are designed and installed under the guidance of FAA Advisory Circular 150/5220-22B (incorporated herein by reference in its entirety).

A number of guidelines and design standards for EMAS outlined in AC 150/5220-22B are summarized below. Although the summaries below use the term "must", and the FAA recommends that the guidelines for EMAS in this circular be followed by all airport operators, these guidelines are not strictly mandatory unless the EMAS is funded by federal grant assistance programs or installed at an airport which is certificated under 14 C.F.R. § 139 ("Airport Certification").

In brief, an EMAS is designed to stop an overrunning aircraft by exerting predictable deceleration forces on its landing gear during the overrun event as the EMAS material deforms. The EMAS should be designed to minimize the potential for structural damage to aircraft as such damage could result in injuries to passengers and/or affect the predictability of deceleration forces of the EMAS. The EMAS should be designed with the expectation of a 20-year service life.

An EMAS must be located beyond the end of the runway and be centered on the extended runway centerline. The EMAS will usually begin at some setback distance from the end of the runway to avoid damage due to jet blast and undershoots, and this distance will vary based upon the available area and local conditions.

U.S. Federal Aviation Administration guidelines provide that an EMAS should decelerate the design aircraft (the airplane type that regularly uses a particular runway and that imposes the greatest demand on the EMAS) which leaves the runway and enters the EMAS at a speed of 70 knots. If there is insufficient space for a standard EMAS bed, a non-standard EMAS should be designed for a 40-knot minimum aircraft speed. An EMAS that cannot provide at least this minimum performance is not considered a cost-effective safety enhancement.

The EMAS must be a passive system which does not require external means to initiate or trigger the operation of the EMAS to arrest an aircraft's movement. The minimum width of the EMAS is to be the width of the runway, and the width is to be based on the standard runway width for the applicable aircraft design group. The EMAS must be constructed on a paved base which should perform satisfactorily under all local weather, temperature, and soil conditions. The EMAS also should not allow water to accumulate on the surface of the bed, runway, or RSA, and allow snow and ice to be removed.

In accordance with AC 150/5220-22B, an EMAS design must be supported by a validated design method that can predict the performance of the system using the aircraft that imposes the greatest demand upon the EMAS, which is usually the largest/heaviest aircraft which uses the runway. The design must be derived from field or laboratory tests which are based on the passage of an actual aircraft or equivalent single wheel through a test bed. The model must consider multiple aircraft parameters such as (but not limited to) aircraft gear loads, gear configuration, tire contact pressure, and aircraft speeds.

FAA Order No. 5200.9 (incorporated herein by reference in its entirety) provides airport operators with additional guidance regarding (a) RSA improvement alternatives that use EMAS systems, and (b) determining the maximum financially feasible cost for RSA improvements, whether they involve EMAS or not.

Overrun events can be caused by many factors, and can occur during taxiing on the ground, during an aborted or rejected takeoff when the aircraft does not leave the ground, or during landing when the aircraft cannot stop before the end of the runway. There are several general assumptions which are used for all EMAS designs, as summarized below:

A. an aircraft is still attempting to stop as the runway is exited;
B. there is minimal or no structural damage to the landing gear; and
C. there is no aircraft braking or use of reverse thrust/reverse pitch once an aircraft enters the EMAS.

In order to obtain the greatest arresting effects from an EMAS, the pilot of the aircraft usually aims for the centerline of the extended runway and, once stopped in the EMAS area, the aircraft is to remain stationary and to await further assistance from airport ground staff.

Within the United States, most of the EMAS have been installed by the Engineered Arresting Systems Corporation (ESCO) of Logan Township, N.J., as ESCO had been the only supplier qualified to design and install EMAS systems. In 2014, an arrestor system utilizing foam glass topped by a layer of concrete and a polymer topcoat was installed at Midway Airport (Chicago) by Runway Safe (Austin, Tex.). In September 2015, Runway Safe announced that they would install five additional EMAS systems at Midway and O'Hare Airports in Chicago. Specific details regarding the structure and composition of this system were not provided.

Current EMAS system arrestor beds in the U.S. today are required to observe the following condition: "Materials must meet a force vs deformation profile within limits having been shown to assure uniform crushing characteristics, and therefore predictable response to an aircraft entering the arresting system."

The materials comprising the EMAS must satisfy a number of requirements which can be quickly summarized as being non-flammable and able to resist the elements. Finding a material that can do both suggests looking at natural inorganic materials, materials used in building and construction, and hybrid materials where each component addresses one or more of the FAA requirements.

While there are certain polymeric materials which satisfy FAA flammability and environmental resistance requirements, all of these materials are very expensive and structurally reinforced to the point that they would make very poor runway arrestor materials. Consequently, most research has focused on inorganic materials and composites rather than organic-based polymeric materials.

U.S. Pat. No. 8,579,542 to Narmo (assigned to Norsk Glassgjenvinning AS, Norway) discloses a vehicle arresting system for decelerating vehicles. The vehicle arresting system includes a bed filled with foamed glass aggregate, and a top lid covering the upper surface of the bed. The foamed glass aggregate is in the form of glass which is melted, aerated, solidified, and then crushed to obtain rough broken particles with sizes ranging from 0.25 cm to 15 cm. Narmo does not disclose aggregates comprising smooth rounded particles, or particles having a narrow controlled size range.

US 2013/0020437 to Valentini et al. (assigned to Engineered Arresting Systems Corporation, Aston, Pa.) discloses packaging and covers for maintaining integrity of a vehicle arresting bed formed of aggregates such as those disclosed by Narmo. The beds are covered in whole or part with a geotextile in the form of mesh or a net, or are bagged or boxed and covered with asphalt. In certain embodiments, loose aggregates are mixed with adhesives or binders to form bricks or other integrated units. Valentini does not disclose smooth rounded aggregates. Valentini also does not disclose installing vehicle beds in containers with lids which support the weight of a light object such as a person.

U.S. Pat. Nos. 6,685,387; 6,971,817; 7,261,490; and 7,597,502 to Allen at al. (assigned to Engineered Arresting Systems Corporation, Aston, Pa.) are directed to jet blast resistant vehicle arresting blocks, beds, and methods. The arresting beds are formed of a block of a compressible material such as cellular concrete, and an intermediate material such as a foam layer is positioned over the compressible material. A frangible top covering the block is disclosed to provide a damage-resistant surface. Allen does not disclose smooth rounded glass aggregates as an arresting medium.

U.S. Pat. No. 5,885,025 (assigned to Datron Inc., Garland, Tex.) and U.S. Pat. No. 6,726,400 (assigned to Engineered Arresting Systems Corporation, Aston, Pa.), both to Angley et al., disclose vehicle arresting beds formed from a large number of blocks of cellular concrete having predetermined compressive gradient strength. The beds have an entry region formed of blocks having a first compressive gradient strength, and a second region formed of blocks having a greater compressive gradient strength than that of the first region. Angley does not disclose arresting beds of aggregates formed of smooth rounded glass particles as an arresting medium.

There is a continuous desire for new kinds of systems which can be used to arrest movement of a moving aircraft and which are cost-competitive with current EMAS systems. For example, there is a need for novel arrestor systems into which aircraft tires can sink and which can dissipate large amounts of kinetic energy while simultaneously satisfying the need for resistance to the elements and jet blast.

SUMMARY OF THE INVENTION

The present invention addresses the above problems regarding aircraft and vehicle arrestor systems and presents significant advances in the field of aircraft arrestor systems. In contrast to prior systems which rely almost exclusively upon the compaction of low-density foam materials, the present invention is based upon a mixed mode approach which combines material flow and compaction.

Specifically, the invention is based on the finding that an arrestor system comprising containment cells filled with a loose granular spherical fill material can be used to arrest aircraft motion during an overrun event. Based on this finding, the invention is directed to novel arrestor systems and to methods for arresting aircraft motion using the novel arrestor system. The inventive arrestor system provides a controllable deceleration force on aircraft landing gear and thereby arrests, or at least substantially slows down, aircraft motion. Advantageously, the arrestor systems according to the present invention are less costly than those which are currently available in the marketplace. In addition, the inventive cell-based approach permits simple and straightforward installation and repair of the EMAS while providing robust jet blast protection to minimize damage to aircraft engines.

A first aspect of the present invention is directed to an aircraft arrestor system which provides a controllable deceleration force for an aircraft during an overrun event. The aircraft arrestor system comprises an arresting medium which is contained by a plurality of adjacent containment cells. The arrestor systems arrest aircraft movement by creating a controllable deceleration force or drag force on the aircraft's landing gear during an overrun event.

The present invention controls the amount of drag forces on aircraft wheels by the interaction of several factors:
  A. Fill material strength;
  B. Ullage in containment cells (empty space at the top of a cell between the fill material and the cell lid);
  C. Flow obstruction by vertical cell walls; and
  D. Frangible failure of cover lids and cell walls.

The loose granular nature of the fill material causes it to flow readily when unconfined. If left in an open bed, the arresting forces produced with loose fill on aircraft tires is generally not sufficient to arrest aircraft movement. However, containing the fill material within containment cells changes the dynamic response of the material during an overrun, thereby restricting flow and increasing compaction. This change in loading significantly increases the effective strength of the fill material and provides markedly higher drag loads on the landing gear. Accordingly, the containment cells are an important component of the inventive design since they determine how much material flow and compaction will take place during an overrun event. The containment cells provide sufficient but not excessive confinement of the loose fill material to obtain optimal arresting properties.

It has been discovered that an arresting medium comprised of smooth and rounded expanded glass particles which are loose and unbroken and have an outer surface devoid of angular corners and a narrow size distribution has useful properties as an arresting medium. The expanded glass particles for use in the invention also have a controlled size range of about 0.04 inches to about 0.75 inches, and at least about 75% of the particles have a minimum size which is not less than ¼ of the size of the largest particles. The expression "controlled size range" means that substantially all of the particles have a diameter which is within the recited size range. For example, about 80% to about 100%, or about 90% to about 100%, of the particles have a diameter which is between about 0.04 inches and about 0.75 inches. This narrow particle size distribution assists in furnishing the advantageous arresting properties. In an embodiment of the invention, the particles have a controlled size range of about 0.0469 inches to about 0.75 inches. In further embodiments of the invention, the particles of the arresting medium have an average diameter in the range of about 0.4 inches to about 0.5 inches. In an embodiment of the invention, the particles have an average diameter of about 0.42 inches. For irregularly-shaped particles, the diameter will be the largest dimension The containment cells for containing the arresting medium have side walls and a removable cover or lid. The containment cells are frangible and are structurally configured to fail during an overrun event. Depending on the particular implementation of the invention, certain cells may also have integral bottom surfaces.

The arresting medium flows when uncontained and exhibits a lack of intrinsic interlock or settling over time. In one embodiment, the containment cells have a depth or height of about 18 inches to about 40 inches (about 45 cm to about 102 cm).

The containment cells do not have to be filled completely to the top with the arresting medium to provide arresting properties. In certain embodiments, the cells have from about 0% to about 20% ullage (unfilled headspace at the top of a container) after being filled with the arresting medium.

The internal side walls of the containment cells can be any convenient distance apart. For example, the side walls can be about 4 feet to about 12 feet (about 1.2 meters to about 3.6 meters) apart. The containment cells can have any particular shape, such as cubic, rectangular, polygonal, or other shape as long as they provide a substantially continuous bed of adjacent cells without large empty gaps between cells.

Each of the containment cells will be covered by a lid after filling to prevent loss of the arresting medium and damage due to environmental factors such as ice, rain, or wind. The lids can be attached to the cells using any kind of convenient fasteners (such as snap-on connectors) as may be deemed necessary to allow the lids to be readily detached and reattached as desired. The containment cell lids can optionally be covered with a paving material, or the lids can be painted in accordance with FAA regulations for EMAS, for example, with indicia to indicate the extent of the EMAS.

The containment cells can have any convenient shape. For example, the containment cells can be in the form of boxes, troughs, half-troughs, or combinations thereof. The containment cells can also be in the form of built-up component-and-connector cells which share internal vertical walls among cells. Each of these particular forms will be further discussed below.

One or more of the interior vertical walls of selected cells may contain openings. Such openings reduce the presented vertical wall area and thereby increase frangibility and flow of material between cells during the overrun event. The walls of the containment cells will generally be affixed to underlying pavement or ground to prevent their movement.

The aircraft arrestor system may have an optional sloping entrance ramp to allow smooth entry of the aircraft onto the surface of the arrestor system during the overrun event.

The walls of the containment cells can be formed from any convenient materials which provide structural stability to the cells and which can be designed to fail in order to lessen damage to the aircraft during an overrun event. In an embodiment of the invention, the walls of the container cells are formed from acrylic, talc-filled polypropylene, poly (vinyl chloride), fiberglass, or a combination thereof. The lids of the containment cells can optionally be vented if desired to permit air circulation and to lessen entrapment of water vapor or other substances. The walls and lids can be made of a flexible material, such as a continuous rolled plastic sheet, or the walls and lids can be made of a rigid material such as plastic panes, and combinations of such cover materials are within the scope of the present invention. The containment system can be fitted with a drainage system to prevent water retention so that the beads do not become saturated and freeze.

As discussed, the aircraft arrestor system is structurally configured to arrest movement of an aircraft travelling at a ground speed of about 40-70 knots in accordance with FAA regulations for EMAS.

The overall dimensions of the inventive aircraft arrestor system will generally comport with FAA or local airport regulations, and will depend on the size of the design aircraft using the runway. Unless otherwise required by local or federal authorities, the bed depth of the arresting medium will generally be in the range of about 18 inches to about 40 inches (about 46 cm to about 183 cm) so that the aircraft fuselage and engines remain above the height of the arresting medium to avoid or minimize damage to the aircraft. The width of the arrestor system bed will generally be about the same as the width of the adjacent runway, or about 150 feet to about 250 feet (about 46 m to about 76 m). Although the bed length of the arresting medium will depend upon the space available on the ground after the runway, a useful range of lengths for the bed is about 100 feet to about 1000 feet (about 31 m to about 305 m).

The dimensions of the containment cells will vary depending on the particular installation. In an embodiment of the invention, the wall thickness of the cells as well as the lid thickness will be in the range of about 1/16 inch to about ½ inch (about 1.5 mm to about 13 mm). The containment cells do not necessarily have to be filled to the top with the arresting medium, and can have ullage, or unfilled space at the top of the containment cells. The ullage can be in the range of about 0 inches to about 6 inches (about 0 mm to about 152 mm). That is, the surface of the arresting medium can be about 0 inches to about 6 inches (or about 0 mm to about 152 mm) from the top of the containment cell. The ullage can also be about 0% to about 20% of the bed height.

In certain embodiments of the invention, the containment cells have lids in the form of lids with ribs on their bottom surface. The ribs may have a thickness in the range of from about 1/16 inch to about ½ inch (about 1.5 mm to about 13 mm) and a depth in the range of from about 1 inch to about 6 inches (about 25.5 to about 152 mm). The ribs may also have a spacing of about 3 inches to about 12 inches (about 76 to about 305 mm) apart.

Another aspect of the inventions is directed to a method for assembling an arrestor system for arresting movement of an aircraft during an overrun event. The method comprises the steps of:
  (a) installing a plurality of adjacent containment cells at a predetermined location;
  (b) securing the containment cells to underlying pavement or ground;

(c) filling the containment cells with an arresting medium; and (d) installing a removable lid over the containment cells, wherein each containment cell has side walls, and the containment cells are frangible and structurally configured to fail during the overrun event.

The step of affixing the containment cells to pavement may involve using fasteners, screws, brackets, joints, adhesive or other materials to ensure the cells are secured to the pavement or ground. The containment cells may also share common side walls with neighboring cells or have interior walls.

The arresting medium in this aspect of the invention will have the same general properties as those described above for the novel arrestor system. That is, the arresting medium generally comprises smooth and rounded expanded glass particles which are loose and unbroken and have an outer surface devoid of angular corners and a controlled size range, wherein the particles have a controlled size range of about 0.04 inches to about 0.75 inches, and at least about 75% of the particles have a minimum size which is not less than about ¼ of the size of the largest particles. In certain embodiments of the invention, the particles have a controlled size range from about 0.0469 to about 0.75 inches. In an embodiment of the invention, the particles may have an average diameter of about 0.42 inches. For ease of discussion, the arresting medium after installation may also be called a bed or particle bed.

The method of assembling the arrestor system may also comprise the optional step of installing a gradually sloping entrance ramp to allow smooth entry of the aircraft onto the surface of the arrestor system. The entrance ramp will assist in reducing structural damage to the aircraft during an overrun event. The slope will generally be dependent on the placement location of the arrestor system and the type of aircraft using the adjacent runway.

The containment cells will generally be completely or almost completely filled with the arresting medium. In one embodiment, the containment cells after filling with the arresting medium have about 0% to about 20% ullage.

The containment cells can have any structural configuration as long as they satisfactorily contain the arresting medium and can fail as designed during an overrun event. For example, the containment cells can be in the form of boxes, troughs, half-troughs, or a combination thereof. It will be understood that not every containment cell may fail during an overrun event, and that certain containment cells may remain intact after an aircraft's movement is arrested. For example, containment cells in the middle of the arrestor system may fail as an aircraft wheel moves through them during an overrun event, while containment cells along the periphery of the arrestor system are far enough away from the aircraft wheel and will remain intact during the overrun event.

The containment cells can also be in the form of build-up component-and-connector cells which share vertical walls among cells.

The side walls of the containment cells can be formed from any appropriate material which has structural stability and can contain the arresting medium but can fail as designed during an overrun event. In an embodiment of the invention, the containment cell walls are formed from acrylic, talc-filled polypropylene, poly(vinyl chloride), fiberglass, or a combination thereof.

The term "about", when used in connection with any value, is to be understood as allowing a range of ±20% of the given value, or a range of the upper and lower limits for that value. For example, if the size of an element is given as "about 10 inches", the size of that element is permitted to vary from 10 inches±20%, or in the range of from 8 inches to 12 inches.

Other aspects and embodiments of the invention will be evident from the discussion below.

BRIEF DESCRIPTION OF THE DRAWINGS

FIG. 3 illustrates containment cells in the shape of boxes with simple lids.

FIG. 4 illustrates containment cells in the shape of boxes with full-depth lids.

FIG. 5 illustrates containment cells in the shape of troughs with shingled partial lids.

FIG. 6 illustrates containment cells in the shape of half-troughs with shingled partial lids.

DETAILED DESCRIPTION

Figure 1:
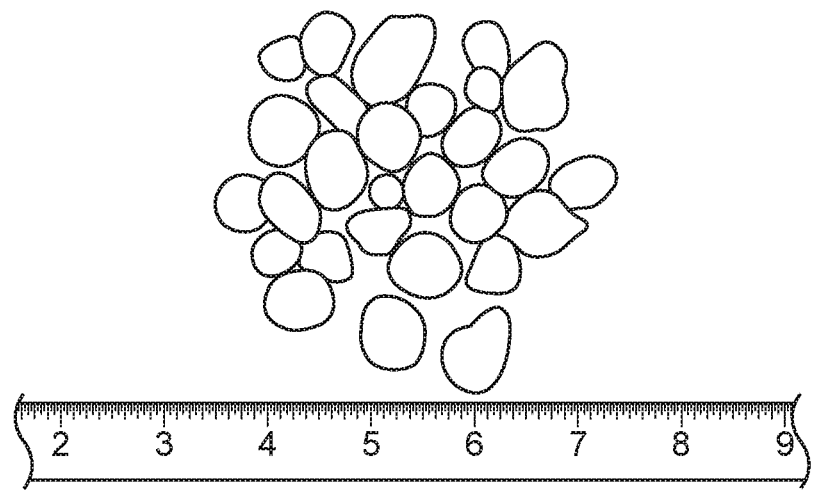
FIG. 1 is a photograph illustrating loose granular smooth and rounded expanded glass particles suitable for use in the present invention as a fill material for arresting motion of an aircraft.

As discussed above, one aspect of the present invention is directed to an aircraft arrestor system which provides a controllable deceleration force for an aircraft during an overrun event. The arrestor system provides an environment into which aircraft tires can sink and can dissipate a large amount of kinetic energy while simultaneously satisfying the need for a non-flammable medium which has high resistance to the elements.

Although the arrestor system will be described with particular reference to stopping movement of an aircraft, it will be evident to those of skill in the art that the principles of the inventive arrestor system can be applied to arresting movement of other vehicles such as automobiles, trucks, and motorbikes, for example, to prepare runaway vehicle arrestor beds along a highway or motor route.

The inventive aircraft arrestor system satisfies competing design demands for loading from overrun events, pedestrian traffic, and jet blast uplift. The cell structure and configuration of the arrestor system provides the following advantages:

A. Environmental protection for the fill material;
B. Regulation of the dynamic arresting drag force;
C. A load path and structure which resists jet blast;
D. A load path and structure which supports pedestrian traffic; and
E. A paintable surface for creating visual markers which allow pilots to identify the end of the runway and the EMAS area.

From the standpoint of structural design, requirements for item (B) above in some ways counteract the requirements for items (C) and (D). For optimum overrun performance, the lids should not be overdesigned as they are to remain frangible during an overrun event and permit the fill material inside of the containment cells to flow around the aircraft wheels. The lids must also remain sturdy enough to resist jet blast from nearby aircraft and to keep to a minimum any fill material from being flung about and thereby potentially damaging the aircraft or engines.

In this regard, EMAS beds are subjected to jet blast loading, particularly as departing aircraft begin their takeoff roll. The horizontal jet blast passes over the EMAS bed, creating a Bernoulli pressure drop that results in a net upward suction load. The pavement attachment and vertical walls of the inventive arrestor system provides a load path to the ground for resisting jet blast uplift and keeps individual containment cells from opening up. When the containment cell lids are equipped with ribs, the uniform pressure on the lids creates an upward flexure which is resisted by the ribbed lid design, thereby reducing the chances for jet blast uplift.

The containment cells of the invention are installed at the end of a runway in the direction in which an aircraft is expected to move during an overrun event. FAA regulations require an EMAS to be constructed on a paved base, although local conditions may make it desirable to construct some or all of the containment cells on cement, asphalt, pavement, earth, or other hard or soft surface at the end of the runway. A perforated rigid or flexible sheet such as an extruded or woven polymer can be placed on the ground or pavement before installation of the arrestor system in order to provide additional protection or a barrier as may be desired.

The containment cells do not necessarily have to be constructed with a distinct bottom surface. Depending on the particular implementation of the invention, the walls of the containment cells can be constructed directly on top of the pavement or other surface and the bottom of the cells will be the pavement surface.

Suitable materials of construction of the containment cells provide the cell walls with high stiffness and resistance to environmental conditions, while providing brittle failure during an overrun event. The containment cells may be formed from a range of possible materials, including polymers, fiberglass, acrylic, and others. Particular physical properties for exemplary materials of construction are shown below:

Acrylic: (Trade name: Acrylite FF)
Modulus: 400 ksi
Strength: 10 ksi
Failure strain: 4.5%
40% Talc-Filled Polypropylene
Modulus: 392 ksi
Strength: 4.5 ksi
Failure strain: 10%
PVC (polyvinyl chloride): Trade name: Aurora Plastics AP2000
Modulus: 370 ksi
Strength: 6.1 ksi
Failure strain: 40%

Furthermore, any of the containment cell components (e.g. lids, walls, bottoms) can contain known additives such as plasticizers, fillers or extenders, stabilizers, pigments, antioxidants, heat stabilizers, light stabilizers, antimicrobial agents, as well as combinations of these or other materials as may be deemed appropriate or desirable.

The lids for the containment cells are prepared from a suitable material to prevent shifting of the arresting medium due to environmental conditions such as wind, rain, or storms. The arresting medium and containment cells have sufficient strength to allow lightweight loads such as a person to move on the lids or the surface of the containment cells without causing damage to the arrestor system. In certain embodiments, the lids may also have sufficient strength to allow a lightweight vehicle to move about on the surface of the cells or the lids without damaging the containment cells or the EMAS bed. In this regard, the velocity and weight of an aircraft entering the EMAS bed will trigger failure of the containment cells and arresting material and concomitant arresting of the aircraft, while a comparatively lightweight person or vehicle will not initiate failure of the containment cells and commencement of an arresting behavior by the invention.

Although there are no specific regulations concerning particular aspects of EMAS cover materials, there are a number of practical considerations with regard to candidate materials. A number of such considerations are summarized below:

A. Must not adversely affect the arresting properties of the EMAS bed;
B. Must require little maintenance and be resistant to deterioration from common airport chemicals such as salt, deicing fluids, oils, ice, snow, and paint;
C. Must not attract wildlife or support unintended plant growth;
D. Must be durable, i.e. last as long as the arresting material;

E. Must be able to withstand 150 mph winds from aircraft jet blast;

F. Must be non-sparking, not sustain a flame, and not give off toxic fumes; and

G. Must adhere to requirements in FAA Advisory Circular 150/5220-22B.

The containment cell lids can be in the form of rigid or flexible sheets, or a combination of both. Each containment cell may have its own lid, or a single lid can be used for a plurality of containment cells. Other arrangements are equally possible and within the scope of the present invention. Exemplary materials of construction of rigid sheets include polymers such as acrylic sheets with polyvinyl chloride connectors to connect the sheets to the vertical walls of the containment cells. Acrylic sheets (or other kinds of plastic panes or panels) can also be used to form the vertical walls of the containment cells and these vertical walls are connected to the underlying pavement or ground. Examples of flexible cover sheets include polymers such as flashspun high-density polyethylene fiber wraps (e.g. Tyvek®) which are bonded to pavement for secure closure of the containment cells. The lids can also be formed of a plurality of elements which are fused or bonded together, for example, using a rigid frame to which a flexible plastic sheet is attached.

Other examples of suitable materials for the containment cell lids are plaster/plasterboard, ceramictile, white ware, water repellant coatings or multi-layer paint systems, engineered multi-layer ground cover systems, modified astroturf coverings, adobe brick, European building materials, granite, and technical ceramics.

In order to avoid or minimize damage to the aircraft or its landing gear during an overrun event, the arresting medium is not configured to provide an immediate hard stop to the aircraft's motion during the overrun event. Rather, the arresting medium absorbs a large amount of kinetic energy as it is crushed and displaced when the landing gear or aircraft moves through the medium. The crushing action of the arresting medium slows the aircraft until it reaches a stationary position. In other words, the aircraft is slowed by the transfer of kinetic energy from the moving aircraft to the arresting medium.

The invention will now be described with reference to the figures. FIG. 1 is a photograph illustrating an embodiment of smooth and rounded expanded glass particles which may be used as the loose granular fill material in the present invention. The photograph illustrates the relative size of the expanded glass fill material in inches. The expanded glass particles are in the form of a cellular material. Because the fill material is substantially or entirely in the shape of smooth and rounded particles, the fill material flows readily and demonstrates very little interlock or settling over time.

The term "smooth" means that the particles generally do not have distinct edges. The term "rounded" means that the glass particles have an overall spherical, ovoid, egg-shaped, oval, elliptical, teardrop, curvilinear, or have any other shape with curved or partly curved surfaces, which can be regular or irregular. The particles can also have an irregular or highly misshapen shape which nevertheless has smooth and rounded surfaces. Because the fill material does not exhibit intrinsic interlock or become compact, the glass particles do not need to be uniform or identical in shape and can be a mixture of any kind of regular and irregular shapes as illustrated in FIG. 1.

The particles do not all need to be smooth and rounded, and the fill medium can include particles which have broken surfaces or non-rounded shapes. For example, up to 25% of the fill material can include particles which are not smooth and rounded, or which are partly but not entirely smooth and rounded. The allowance for such particles in the fill medium permits a reduction in manufacturing costs without impacting the ability of the fill material to arrest movement of an aircraft. Nevertheless, the relatively small amount of particles which do not have a smooth and rounded shape will not appreciably affect the physical properties of the arresting medium, nor the ability of the arresting medium to slow down an aircraft passing through the arresting system.

The fill material can be manufactured from post-consumer recycled glass, thereby advantageously recycling such material and removing it from the waste stream. Alternatively, the fill material can be manufactured from virgin glass. The expanded glass beads have sufficiently low density that they would not damage an aircraft engine if ingested in small quantities.

The fill material particles do not need to be bonded together and therefore the fill material does not contain a binder such as cement. Tests with cementitiously-bonded glass beads showed that glass beads containing a low-strength binder formulation generally produce a fill material having drag forces which are too low for effective use as an EMAS. If the binder/glass bead combination is too weak, the aircraft tires sink through the fill material to the underlying paved area, breaking up the fill material as large chunks and generating insufficient drag force to arrest the movement of the aircraft.

Tests with strong binder/glass bead combinations showed that tires simply rode on top of the fill bed and did not allow tires to sink into the glass particles. Therefore, such beds did not produce enough of a drag force which would arrest movement of an aircraft.

The expanded glass beads for use in the present invention can be custom-manufactured or purchased commercially. Commercial examples of glass beads which are suitable for use as a fill material include Poraver® P480 (from Poraver North America Inc., Innisfil, Ontario, Canada) and Bubble Glass™ (from Viceroy Ceramics Inc., Upper Sandusky, Ohio).

The height of the containment cells will depend upon the particular embodiment of the invention, local conditions, and the design aircraft for the EMAS bed. One consideration regarding bed dimension size is the potential for foreign object damage in the aircraft engine if the bed is too deep. For example, some variants of the Boeing 737 have as little as 1½ feet of clearance between the bottom of the engine and the runway. Consequently, even if the mouth of the engine inlet is higher than the lowest point on the engine, practical considerations may require limiting the depth of an EMAS bed to about 2 feet to avoid issues with foreign object damage to the aircraft engine.

Figure 2:
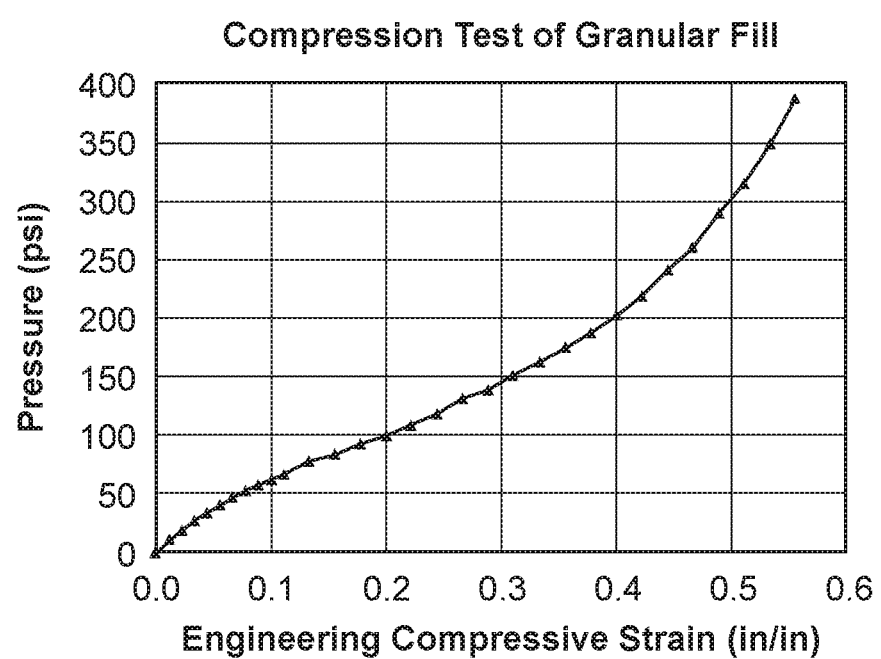
FIG. 2 is a chart illustrating a confined cylinder compression test curve for the low density expanded glass particles illustrated in FIG. 1.

FIG. 2 is a chart illustrating a confined cylinder compression test curve for the low density expanded glass particles illustrated in FIG. 1. The test was conducted using a cylinder which was 12-inch diameter and 9-inch high, and the compression test results indicate that cellular glass particles can be compressed and can absorb kinetic energy from the moving aircraft to arrest its movement.

As previously stated, the arresting medium will be placed into containment cells rather than poured loosely on the ground at the end of the runway. The containment cells regulate the dynamic arresting forces exerted on the landing gear by the arresting medium. The containment cells also protect the arresting medium from the environment and prevent the particles from being blown or washed away, particularly by wind, precipitation, or engine blasts.

As discussed, in certain embodiments of the invention, the lids of the containment cells provide a surface for pedestrians to walk on for maintenance or for aircraft egress after an overrun event. In this regard, FAA regulations provide that an EMAS is to be capable of supporting regular pedestrian traffic for maintenance of the EMAS bed, but an EMAS is not intended to support general vehicular traffic.

The lids of the containment cells can also be painted to create visual markers for pilots or airport staff to identify the EMAS area, for example, in accordance with AC 150/5220-22B which requires an EMAS to be marked with yellow chevrons as an area which is unusable for landings, takeoff, and taxiing.

The structure of the containment cells will depend on the particular embodiment of the invention, and the containment cells may assume a number of different geometric configurations. The particular cell geometry selected will depend upon a number of factors, including constructability, portability to the site, prefabrication and filling of the containers prior to shipment, collapsibility for minimal space consumption in the case of empty transport, and repairability following an overrun. Exemplary embodiments of containment cells are illustrated in FIGS. 3-7. In these illustrated embodiments, the containment cell lids are in the shape of distinct lids. It will be clear that certain kinds of containment cells can be manufactured off-site and shipped essentially fully assembled to the area of installation, whereas other kinds of containment cells will be manufactured as individual components and shipped to the area of installation for assembly.

Figure 3:
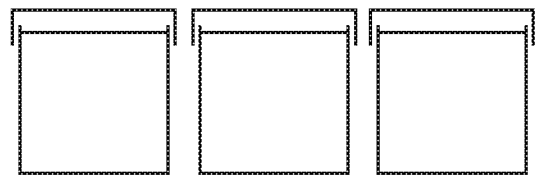
FIGS. 3-6 illustrate cross-sections of various containment cells suitable for use in the present invention.

FIGS. 3-6 illustrate cross-sections of containment cells in the shape of boxes and troughs suitable for use in the present invention. Specifically, FIG. 3 illustrates containment cells in the shape of boxes with simple lids. The individual containment cells may be placed side-by-side at the desired location, filled, and then fitted with individual lids. The boxes can also be pre-filled at another location and fitted with lids prior to shipment and installation at the intended location. As seen in FIG. 3, the lids cover the top portion of the containment cells and do not extend substantially down the sides of the boxes. The installation process includes securing the containment cells to the pavement, which may include the use of bracings or other fasteners.

Figure 4:
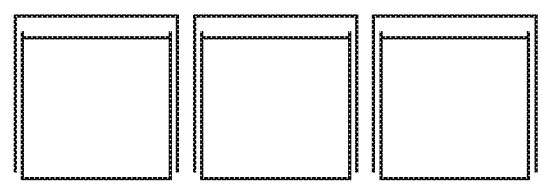

FIG. 4 illustrates containment cells in the shape of boxes with full-depth lids. These full-depth lids extend substantially down the sides of the boxes and provide additional vertical wall strength at the installation location. The full-depth lids also prevent the boxes from bulging if they are prefilled prior to shipment and installation.

The boxes illustrated in FIGS. 3 and 4 have integral bottoms and can have any dimensions. The boxes are illustrated as having a generally cubic appearance, although they can also be rectangular or have other shapes consistent with the invention.

Figure 5:
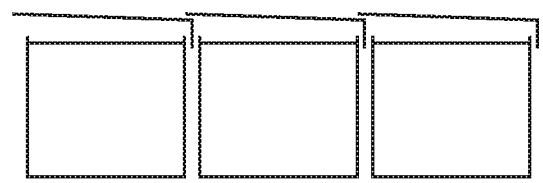

FIG. 5 illustrates containment cells in the shape of troughs with shingled partial lids. Such troughs have a length which is substantially longer than their width. The troughs are installed at the end of the runway next to each other to obtain the EMAS. The troughs can be installed so that their lengths are parallel or perpendicular to the length of the runway, or a portion of the troughs run parallel to the length of the runway and the remaining troughs run perpendicular to the length of the runway. Alternatively, combinations of such arrangements can be used. The troughs can be covered with shingled partial lids as illustrated, in which the lids overlap one another at a slight angle. This shingled lid feature provides an integrated cover to the arresting system across the length and width of the entire bed. The slight angle of inclination of the lid allows precipitation such as rain to run off the surface of the bed. The troughs can also be provided with simple lids, full-depth lids, or any other kinds of suitable covers. These troughs also have distinct bottoms along their lengths. The troughs are affixed to the pavement using fasteners or other means to prevent movement or shifting and to provide additional structural stability.

Figure 6:
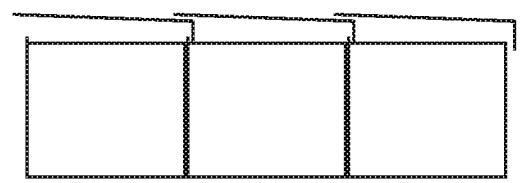

FIG. 6 illustrates containment cells in the shape of half-troughs with shingled partial lids. The half-troughs also have a length which is substantially longer than their width, but they do not all have two parallel vertical side walls. The half-troughs are installed in a manner in which each half-trough presents only a single vertical wall and therefore is interlocked with its neighboring trough and to the pavement to provide structural integrity to the arrestor system. The troughs in FIG. 6 have shingled partial lids, but consistent with the invention, can have any kind of lids or covers.

Figure 7:
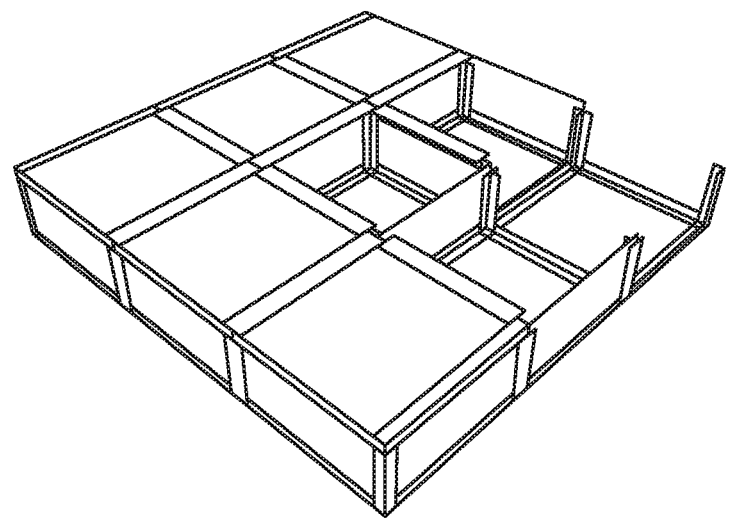
FIG. 7 illustrates containment cells in the shape of built-up component-and-connector cells.
Figure 16A:
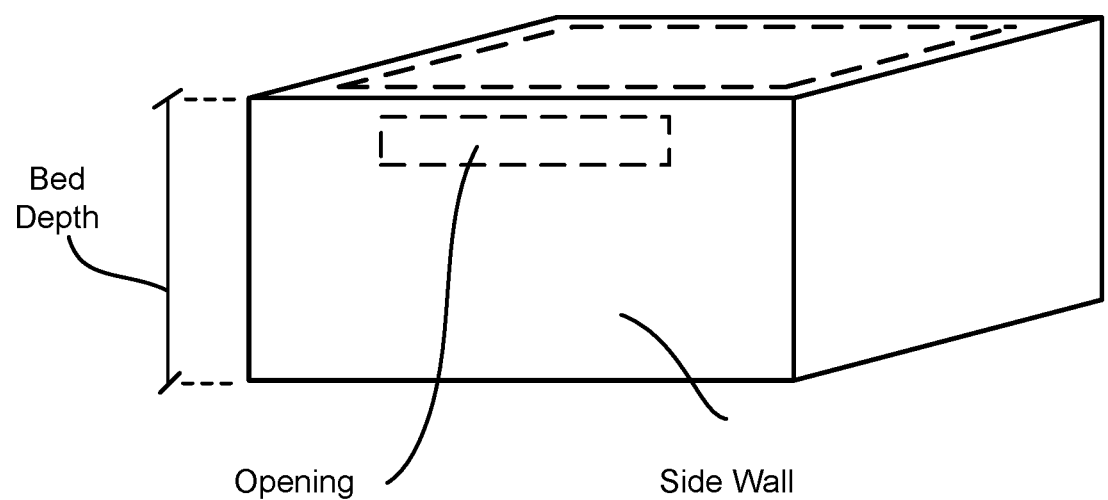
FIG. 16A illustrates an isometric view of a containment cell with example dimensions, in accordance with an embodiment.
Figure 16B:
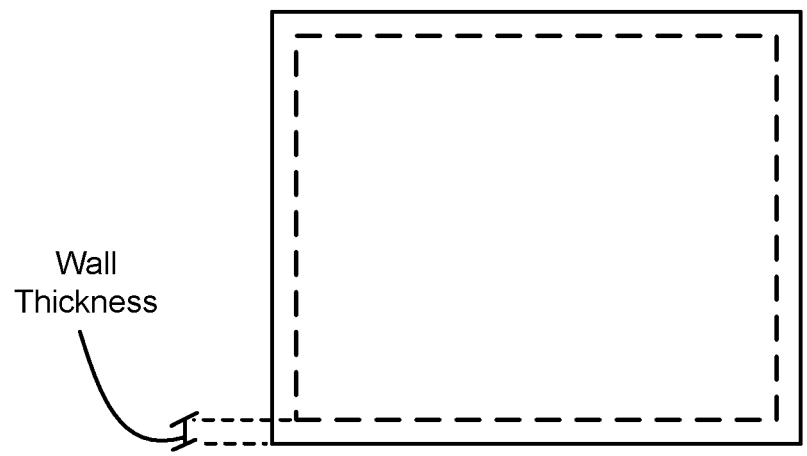
FIG. 16B illustrates a top view of the containment cell of FIG. 16B with example dimensions, in accordance with an embodiment.
Figure 16C:
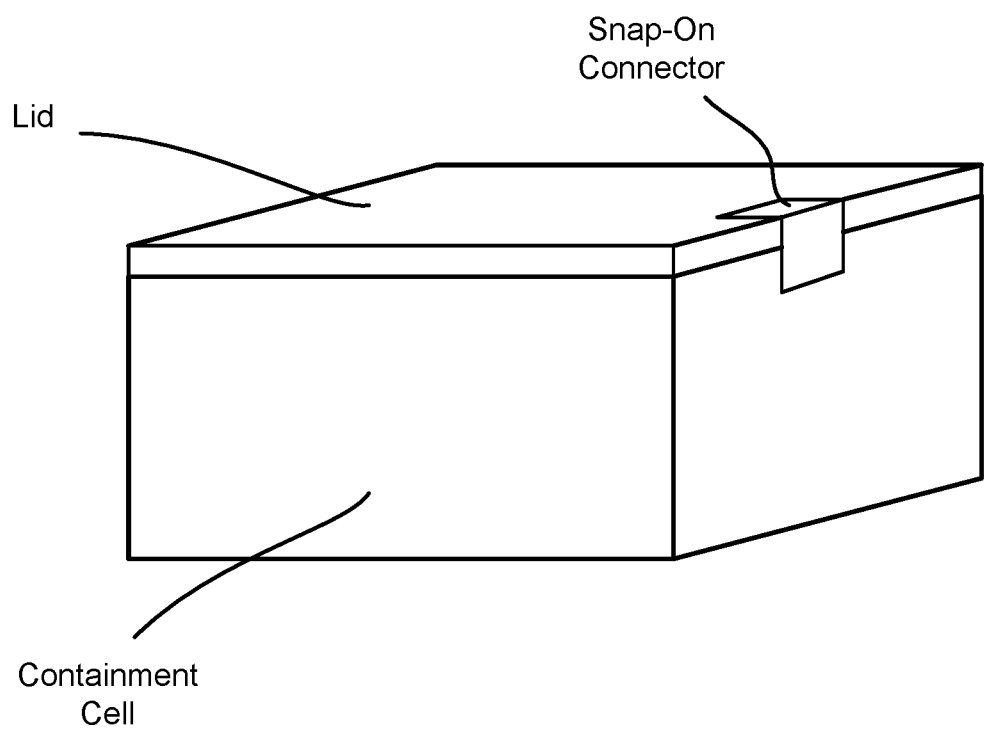
FIG. 16C illustrates an isometric view of the containment cell of FIG. 16A coupled to a lid, in accordance with an embodiment.
Figure 17:
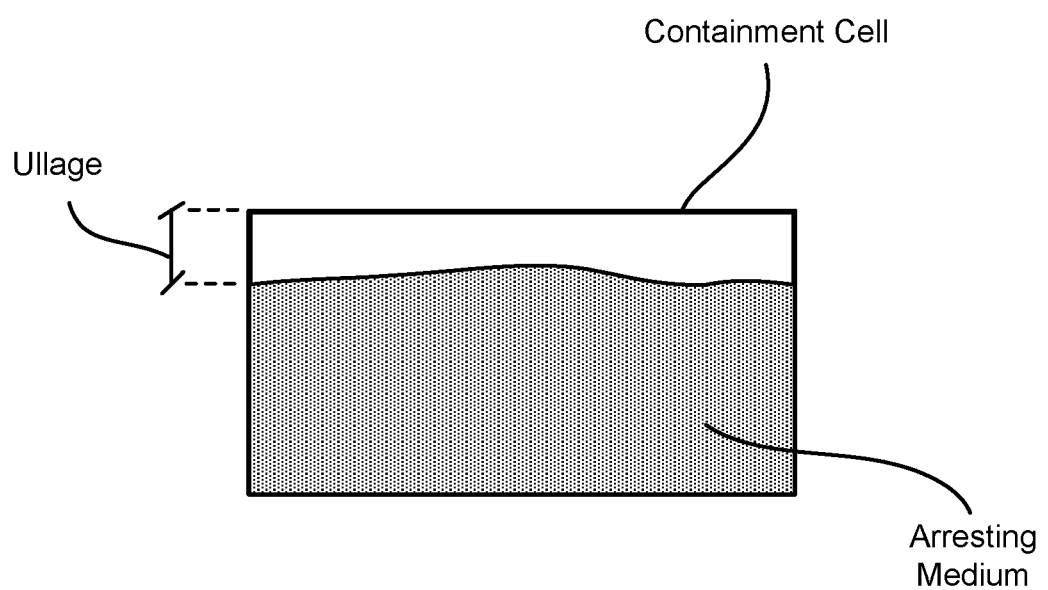
FIG. 17 illustrates a side view of a containment cell containing an arresting medium, in accordance with an embodiment.
Figure 18A:
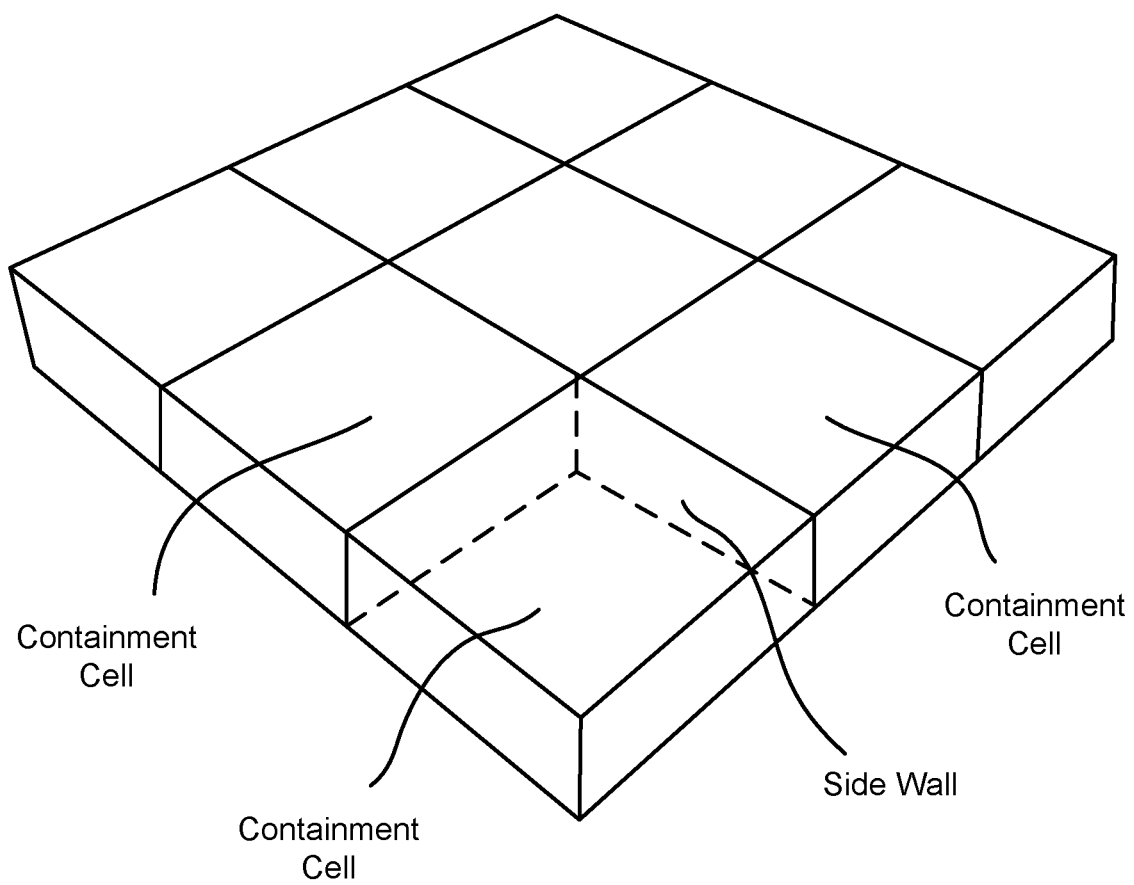
FIG. 18A illustrates an isometric view of a bed, in accordance with an embodiment.
Figure 18B:
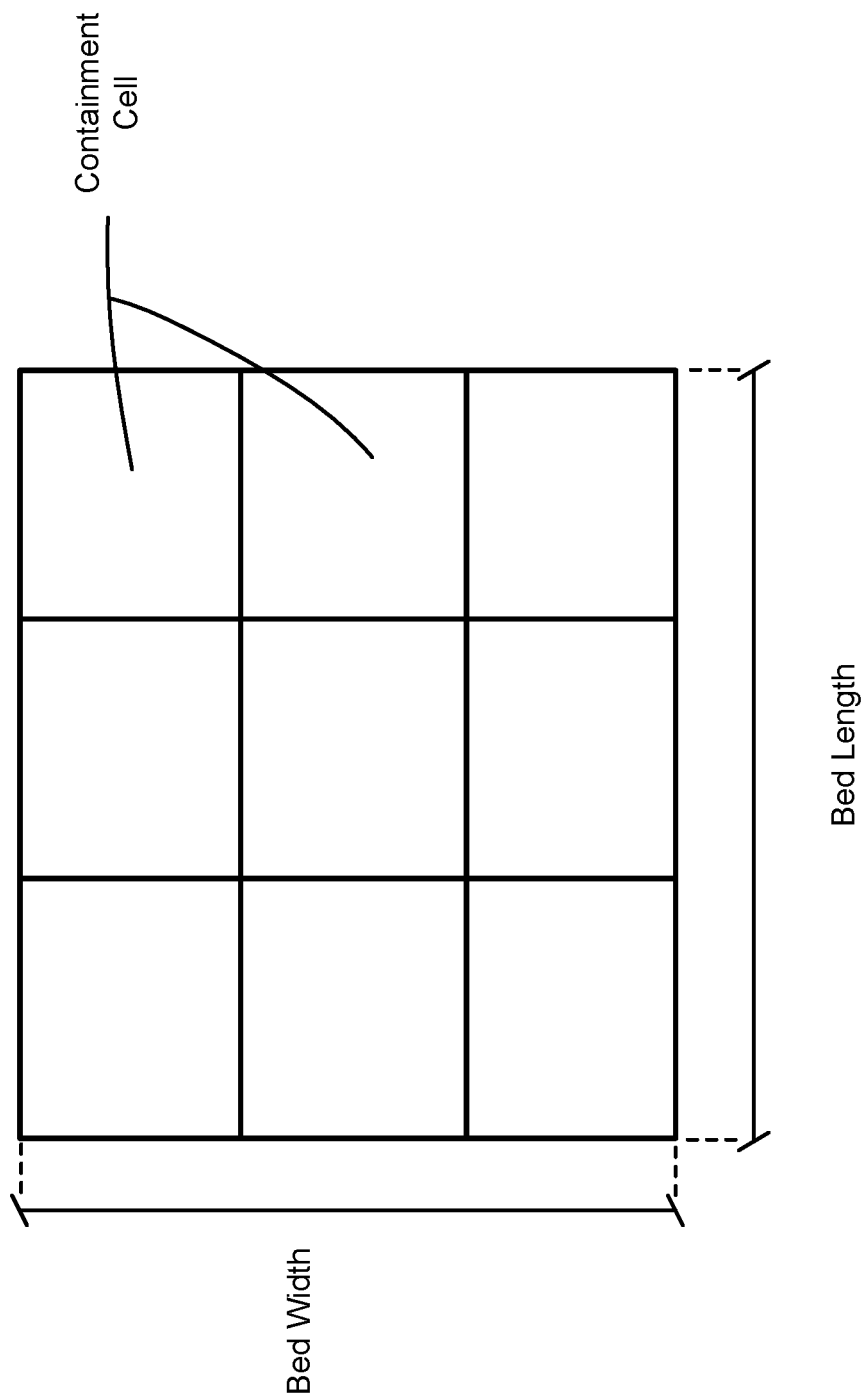
FIG. 18B illustrates a top view of the bed of FIG. 18A with example dimensions, in accordance with an embodiment.

FIG. 16A illustrates an embodiment of a containment cell. FIG. 16A is an isometric view of a containment cell with example dimensions, in accordance with an embodiment. The example dimensions in FIG. 16A illustrate bed depth. FIG. 16B illustrates a top view of the containment cell of FIG. 16B with example dimensions, in accordance with an embodiment. The example dimensions in FIG. 16B illustrate wall thickness. FIG. 16C illustrate an isometric view of the containment cell with a lid coupled to a side wall by connector, e.g., snap-on type, in accordance with an embodiment. The example containment cell shown in FIGS. 16A-16C can be included in a containment cell array, as shown in FIG. 7. FIG. 7 illustrates containment cells in the shape of built-up component-and-connector cells. As illustrated in the figure, the cells are built up on-site using individual sheet panel walls and vertical connectors. The vertical connectors are fastened to the ground or pavement, and the sheet panels are subsequently fitted into the connectors as walls to form cells for containment of the arresting material. All internal vertical walls are shared between cells, thereby creating an integrated cellular structure across the bed. In other embodiments of the invention, the cells can be made of long flexible sheets which are affixed to one or more vertical fasteners. Each of the cells can have a cover or lid as illustrated, or a single sheet or cover can be placed over a plurality of cells. FIG. 18A illustrates an isometric view of a bed including containment cells, in accordance with an embodiment. The containment cells shown in FIG. 18A are substantially the same as the containment cells shown in FIG. 7. FIG. 18B illustrates a top view of the bed of FIG. 18A with example dimensions, in accordance with an embodiment. The example dimensions include bed length and bed width.

One or more vertical walls of selected cells may contain internal openings to reduce the presented vertical wall area and to increase frangibility and flow of material between cells during the overrun event, as shown in FIG. 16A. For example, the openings can be cutouts or holes which cause flow of material between adjacent cells. Similarly, the openings can be formed by removing (or not installing) particular internal walls of the cells. The containment cell shown in FIG. 16A includes an opening on the side wall.

In order to seal out moisture and/or prevent airflow and leakage into the containment cells, the cell joints may be sealed with a conventional joint sealant as is known in the art to prevent water infiltration or entry of pests. The joint sealant can be used with any particular containment cell geometry. Alternatively, the joints may remain unsealed in order to provide air exchange into the containment cells to avoid a lack of air flow which may encourage formation of mildew or mold. The containment system can have drainage or be fitted with a drainage system to prevent water retention such that the beads do not become saturated and freeze.

Figure 8:
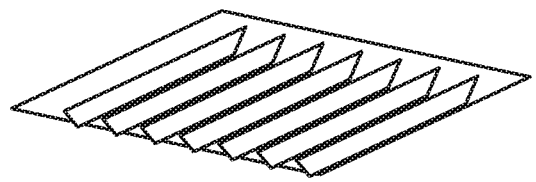
FIG. 8 illustrates the top of a containment cell lid having optional ribbing on the underside of the lid to provide flexural stiffness.
Figure 9:
FIG. 9 illustrates the bottom of the containment cell lid illustrated in FIG. 8 with the optional ribbing.
Figure 19A:
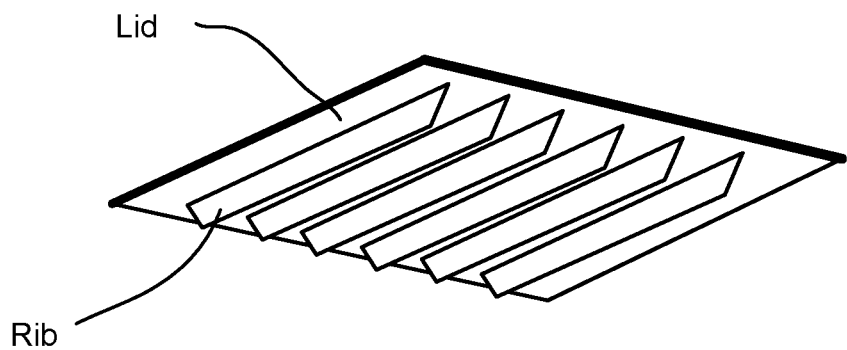
FIG. 19A illustrates an isometric view of a lid, in accordance with an embodiment.
Figure 19B:
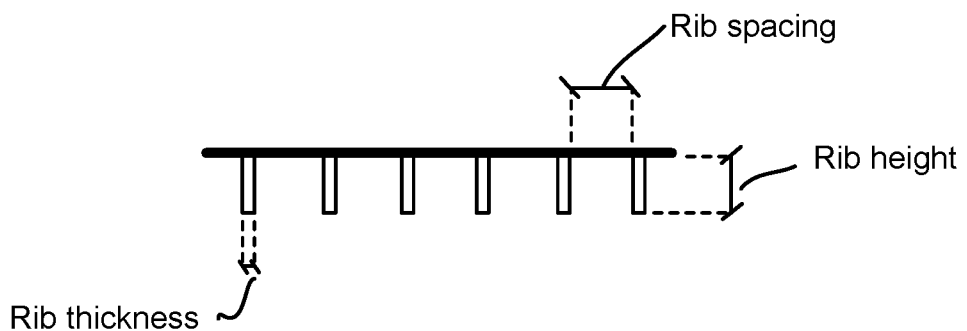
FIG. 19B illustrates a side view of the lid of FIG. 19A with example dimensions, in accordance with an embodiment.
Figure 19C:
FIG. 19C illustrates a front view of the lid of FIG. 19A, in accordance with an embodiment.

Regardless of the type of containment cells used in the invention, the cell lids may optionally be provided with ribbing. The ribbing provides flexural stiffness and added stability to the lids for withstanding jet blast loading and pedestrian traffic. FIG. 8 illustrates the top of a containment cell lid having optional ribbing on the underside of the lid, and FIG. 9 illustrates the bottom of the containment cell lid illustrated in FIG. 8 showing the ribbing. The ribbing may run in one or two (or more) directions, and may be placed anywhere on the bottom of the lid. The ribbing may also be placed on the top of the lid, or the lids may have such ribbing interwoven or impressed into the lid material as may be desired. The lids may also be corrugated, ridged, grooved, or striated to increase their strength. In certain embodiments, the lids may optionally be covered with a paving material such as cement to provide a uniform surface and rapid drainage of surface water. The lids may also be painted with indicia to indicate the location of the EMAS beyond the runway. The lids with ribs are also illustrated in FIGS. 19A-19C. FIG. 19A illustrates an isometric view of a lid, in accordance with an embodiment. The lid includes ribs on its bottom surface. FIG. 19B illustrates a side view of the lid of FIG. 19A with example dimensions, in accordance with an embodiment. The example dimensions include rib thickness, rib height, and rib spacing. FIG. 19C illustrates a front view of the lid of FIG. 19A, in accordance with an embodiment.

Figure 10:
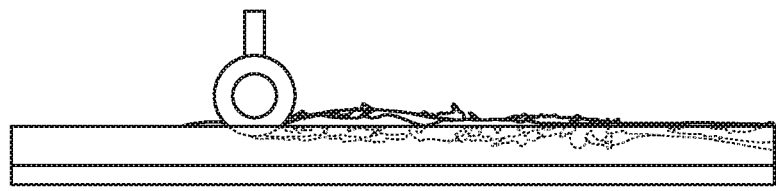
FIG. 10 illustrates the relative effect of a containment cell lid made of a thick material on arresting the movement of an aircraft.

FIG. 10 illustrates the relative effect of a containment cell lid made of a thick material, or a lid which has strong resistance against tearing, on drag forces produced on an aircraft wheel moving through an arresting medium. The figure shows that a lid which has strong resistance against tearing causes the aircraft wheel to ride on the top of the arresting medium and does not allow the wheel to penetrate deeply into the arresting bed. As a result, the wheel is subjected to low drag forces which may not be sufficient to stop the aircraft's motion before the aircraft reaches the end of the EMAS bed.

Figure 11:
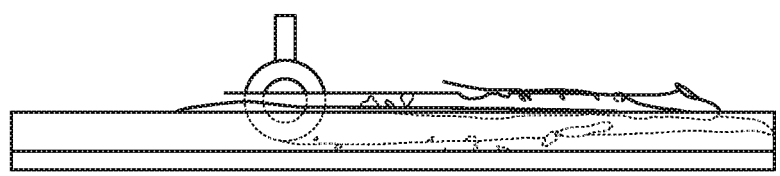
FIG. 11 illustrates the relative effect of a containment cell lid made of a thin material on arresting the movement of an aircraft.

FIG. 11 illustrates the relative effect of a containment cell lid made of a thin material or a material which tears or fails readily. In contrast to FIG. 10, in which the wheel rides on the surface of the arresting bed, FIG. 11 shows that a thin lid material, or a lid material which fails readily, permits the aircraft wheel to penetrate deeply into the arresting bed and produces high drag forces to facilitate arresting movement of the aircraft. It will be understood that the lid cannot be too weak or prone to failure as a weak lid or cover material can be readily damaged due to environmental conditions such as airfield debris or wildlife.

Figure 12:
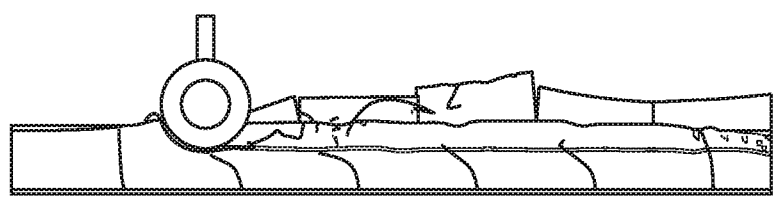
FIG. 12 illustrates the relative effect of a containment cell having no ullage on arresting the movement of an aircraft.
Figure 13:
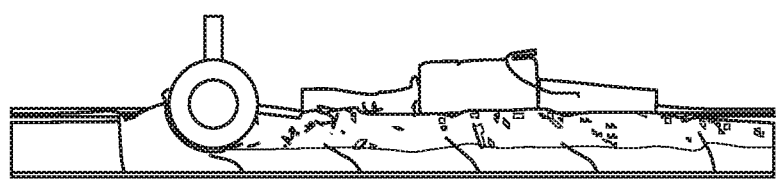
FIG. 13 illustrates the relative effect of a containment cell having ullage on arresting the movement of an aircraft.

FIGS. 12 and 13 illustrate the relative effect of ullage on the arresting behavior of containment cells. In FIG. 12, the containment cells have no ullage and therefore the lids are placed directly on top of the arresting medium in the cells, with no free space at the top of the cells. If an aircraft wheel moves onto the arresting system, there is limited material flow of the arresting medium within the containment cells, resulting in a concomitant shallow tire penetration and a low degree of shear force and limited stoppage of the aircraft.

In contrast, FIG. 13 illustrates the relative effect of a containment cell having ullage. As the aircraft wheel moves through the arresting medium, there is a higher amount of material flow within the arresting medium. The aircraft wheel sinks more deeply into the arresting bed than in FIG. 12, and produces higher drag forces as the arresting medium flows around the wheel and is crushed.

Experimental Test Results

Figure 14:
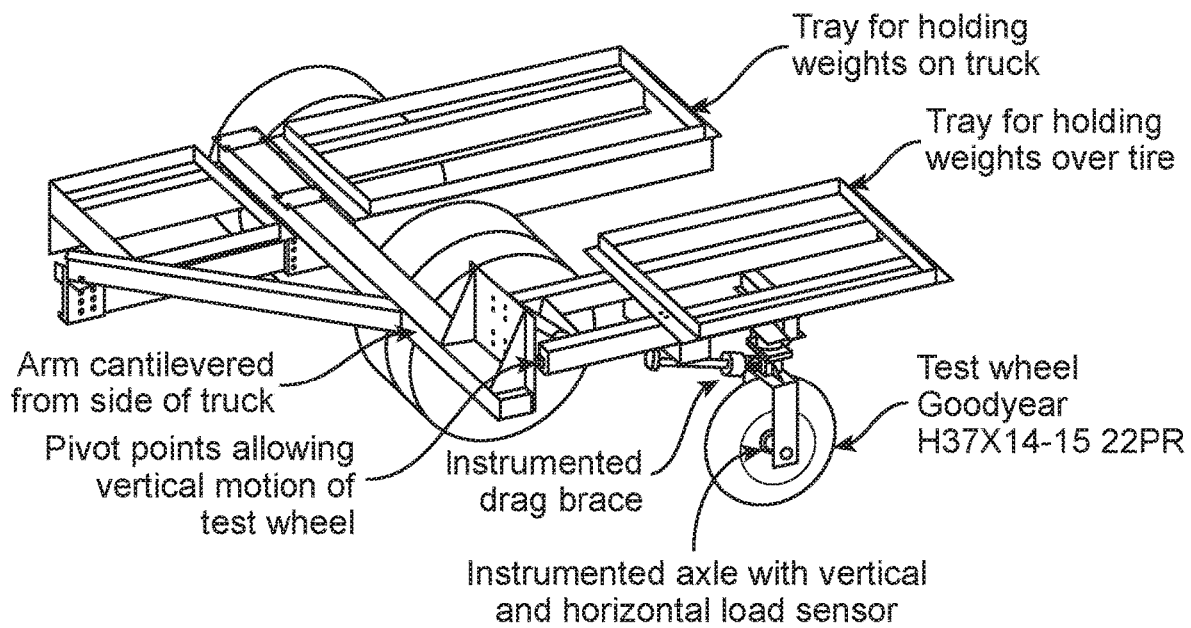
FIG. 14 illustrates an exemplary embodiment of a test rig for measuring loads on a candidate arrestor system.
Figure 15:
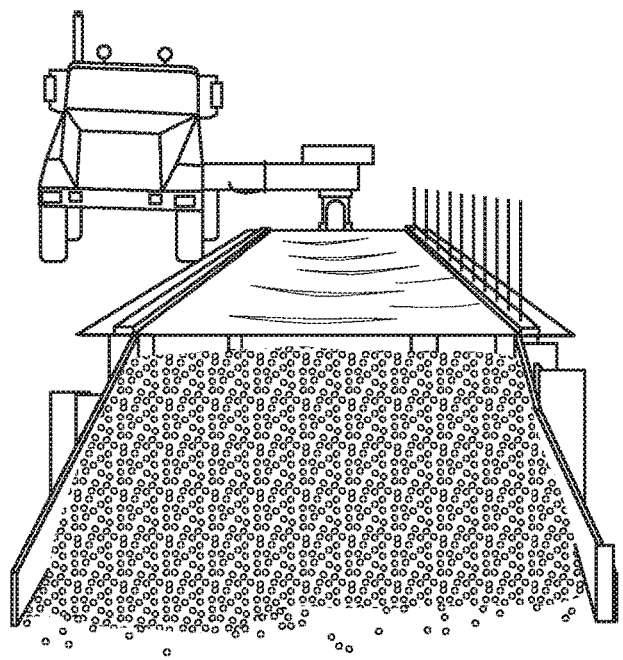
FIG. 15 shows the test rig of FIG. 14 entering an EMAS test bed.

FIG. 14 illustrates an exemplary embodiment of a test rig which was used for measuring loads on a candidate arrestor system. The test rig was prepared by adding a boom and weighted wheel to a truck base. The boom and wheel extend to one side of the truck and were weighted to mimic conditions experienced by an aircraft wheel during an overrun event. The test rig was towed through a test bed of the arrestor material being considered in order to determine the suitability of the candidate arrestor system.

The tire used for the testing was a Goodyear H37X14-15 22PR, which is the nose wheel for a Boeing 767. This tire size is also representative of the main gear tires for Bombardier Global Express and Gulfstream IV business jets. The test rig was initially loaded at 5,000 lb, which was increased in later tests to 11,500 lb, which is close to the 12,300 lb static loading on the nose gear of a Boeing 767.

Test beds of the candidate arrestor system will generally vary in size. Exemplary test beds were about 50 to about 75 feet long and about 6 feet wide, with all of the arrestor material lying on top of a paved area. Ramps of the arrestor material at the ends of the test bed allow the wheel to readily enter the test bed. The tests were limited to under 10 mph due to the limited length of the test bed and for safety of the truck operator.

A summary of experimental test results of various combinations of arresting materials and lids is shown in Table I below. The tests compared various kinds of containment cell materials, cover materials, and fill materials (both bonded and in the form of loose particles).

In Table I, a computed quantity referred to as "drag pressure" was used to compare different test results in order to normalize the data, for example, if the testing was conducted on beds of different depths. Drag pressure is computed from the measured data using the following equation:

$$\text{Drag Pressure} = \frac{\text{Drag Load}}{\text{Tire Width} \times \text{Depth of Penetration}}$$

Based on analysis of several types of aircraft, the desired drag pressure should be in the range of about 30 to about 40 psi to stop an aircraft entering a two-foot deep EMAS at 70 knots within 400 feet while not exerting excessive load on the landing gear. While the concept of drag pressure is not an exact measure of the performance of an EMAS, drag pressure provides a useful measure for comparing the various test results. Bed systems which were tested and which had drag pressure well above or below the desired range would not be effective as an EMAS due either to unacceptably high or low drag on the aircraft gear.

TABLE I

Summary of Test Conditions and Test Results for Combinations of Arresting Medium and Containment Cells

| Index | Material | Drag Force (klb) | Vertical Force (klb) | Truck Speed (mph) | Avg Depth of Penetration (in) | Drag Pressure (psi) |
|---|---|---|---|---|---|---|
| A | Loose Poraver Beads<br>20 inch deep beads<br>Plywood forms on both sides<br>No cover | 1.9 | <5 | 2.2 | 16 | 12 |
| B | Loose Poraver Beads<br>24 inch deep beads<br>Plywood form on only one side<br>Beads loose to move on other side<br>No cover | 1.3 | <5 | 1.5 | 20 | 7 |
| C | Foamed Concrete<br>24 inch deep foam<br>No cover | 0.7 | <5 | 1.0 | 2 | 35 |
| D | Poraver beads bonded together, bed 1<br>24 inch deep beads<br>Plywood forms on both sides<br>No cover | 2.3 | <5 | 1.8 | 20 | 12 |
| E | Poraver beads bonded together, bed 2<br>24 inch deep beads<br>Plywood forms on both sides<br>No cover | 2.3 | <5 | 3.8 | 20 | 11 |
| F | Small Poraver beads, weak binder bed 1<br>Small beads with weak binder,<br>24 inch deep beads,<br>No plywood forms<br>No cover | 3.6 | <5 | 3.3 | 16 | 22 |
| G | Small Poraver beads, weak binder bed 2<br>Small beads with weak binder<br>24 inch deep beads<br>No plywood forms<br>No cover | 3.1 | <5 | 1.8 | 16 | 19 |
| H | Large Viceroy beads, strong binder bed 2<br>Large beads with strong binder,<br>24 inch deep beads,<br>No plywood forms<br>No cover | 0.4 | <5 | 3.2 | 0 | — |
| I | Foamed Concrete<br>24 inch deep foam<br>No cover | 4.4 | <5 | 2.0 | 7 | 63 |
| J | Viceroy Glass beads with cement binder, bed 1<br>24 inch deep bed<br>No cover | 1.8 | 8.8 | 6.8 | 1.3 | — |
| K | Viceroy Glass beads with cement binder<br>24 inch deep bed<br>No cover | 2.0 | 8.7 | 8.0 | 1.5 | — |
| L | Viceroy Glass beads with no binder<br>30 inch deep bed<br>No cover | 3.9 | 8.5 | 5.3 | 12 | 32 |
| M | Loose Viceroy Glass Beads<br>1/16" Acrylic Sheets cover<br>Two 24" high vertical acrylic sheet baffles every 4'<br>24 inch deep beads<br>No gap between cover sheet and beads | 5.8 (avg)<br>9.9 (max) | 7.7 (avg)<br>16.3 (max) | 3.1 (avg)<br>6.5 (max) | 20 | 29 |
| N | Loose Viceroy Glass Beads<br>1/16" Acrylic Sheets cover<br>One 24" high vertical acrylic sheet baffles every 4'<br>24 inch deep beads<br>No gap between cover sheet and beads | 6.5 (avg)<br>13.4 (max) | 7.1 (avg)<br>12.9 (max) | 2.4 (avg)<br>4.4 (max) | 20 | 33 |
| O | Loose Viceroy Glass Beads<br>1/16" Acrylic Sheets cover<br>Two 24" high vertical acrylic sheet baffles every 4'<br>20 inch deep beads<br>4" gap between cover sheet and beads | 4.0 (avg)<br>6.6 (max) | 8.1 (avg)<br>30.0 (max) | 4.9 (avg)<br>6.0 (max) | 16 | 25 |
| P | Loose Viceroy glass beads<br>1/16" acrylic sheet cover<br>Acrylic Boxes with Baffles every 4 feet<br>4 inch gap between beads and top sheet<br>20 inch beads | 4.9 (avg)<br>8.1 (max) | 8.4 (avg)<br>13.4 (max) | 5.2 (avg)<br>7.2 (max) | 16 | 31 |

TABLE I-continued

Summary of Test Conditions and Test Results for Combinations of Arresting Medium and Containment Cells

| Index | Material | Drag Force (klb) | Vertical Force (klb) | Truck Speed (mph) | Avg Depth of Penetration (in) | Drag Pressure (psi) |
|---|---|---|---|---|---|---|
| Q | Loose Viceroy glass beads 1/8" acrylic sheet cover Acrylic Boxes w/ baffles every 4 feet 4 inch gap between beads and top sheet | 5.4 (avg) 10.4 (max) | 8.2 (avg) 14.6 (max) | 5.4 (avg) 7.1 (max) | 16 | 34 |

A. Testing of Bonded Aggregates

Several tests were conducted to evaluate the arresting potential of bonded aggregates for use as a fill material in an EMAS bed.

1. Foamed Concrete as Control

Foamed concrete, which is the material used in EMAS installations from ESCO (Engineered Arresting Systems Corporation in Logan Township, N.J.), was tested as a control material (see rows C and I of Table I). The first of these tests (row C) produced an acceptable drag pressure, but the material was too stiff for the tire size and weight tested. In the second test (row I), the foamed cement produced a drag pressure that was higher than would be desired for most aircraft. The material also had high variability in the drag force developed, which illustrates that the fabrication of foamed cements would have to be performed under carefully-controlled conditions to obtain the material characteristics which would be suitable for use as an EMAS.

2. Cementitiously-Bonded Glass Beads

Several tests were also performed on cementitiously-bonded glass beads. These low-density glass beads, supplied by Poraver North America and by Viceroy Ceramics, are lightweight aggregates formed by expanding beads of glass. The tests involving cementitiously-bonded glass beads were conducted using various sizes of beads and various strengths of binder. Tests on the bonded Poraver beads (see rows D through G of Table I) resulted in drag forces which were too low for effective use of the bonded material as an EMAS. Tests with stronger cementitious binder formulations and Viceroy glass beads (see row H of Table I) indicated that the stronger binder was too strong and did not allow the tire to sink into the EMAS bed. Additional tests were performed using a higher load on the tire (see rows J and K of Table I) with an alternate formulation of binder and Viceroy glass beads. However, these tests also showed that the binder was too strong. The tire did not sink into the EMAS bed and therefore did not produce much drag force.

The multiple tests conducted using expanded glass beads bonded with cementitious binders generated arresting properties which were too weak or too strong for use in an EMAS bed. If the strength of the binder/bead system was too weak, the result was that the tire sank to the paved area, breaking up the arresting medium as large chunks and generating too little drag force. If the binder/bead system was too strong, the tire simply rode across the top of the bed, generating very little drag force. Based on these tests, and superior results obtained by using loose beads, EMAS configurations using expanded glass beads with a cementitious binder were not pursued further.

B. Testing of Loose Aggregates

Table I also shows test results obtained for two different kinds of loose aggregate expanded glass beads from Poraver and Viceroy. These materials were tested both without any lid and with Tyvek house wrap material or acrylic sheets as lids that could be used to protect the fill material from jet blast.

Test results for EMAS beds of loose Poraver beads are shown in rows A and B of Table I. In these tests, the drag pressure generated was lower than would be desired for use as an EMAS. EMAS beds of loose Viceroy beads are show in rows L through Q of Table I. These trials produced drag pressures at the lower end of the desired range, and the results depended on the bed depth, the constraining lid, and the wall material used in the configuration. For the best configurations tested (rows N, P, and Q of Table I), the drag pressure was 31 to 34 psi.

C. Testing of Lid Materials

Two different kinds of lid materials for the EMAS were tested: Tyvek® (in the form of flexible bags for containment of the glass beads) and rigid acrylic sheets.

1. Bags Using Flexible Tyvek®-Style Polymeric Sheets

EMAS beds of loose Poraver beads enclosed in Tyvek bags were tested to determine the suitability of using bagged glass beads for the EMAS bed. During the tests (not shown in Table I), the Tyvek bags did not tear but rather caught on the wheel and dragged a large number of beads along the length of the bed. This action resulted in very high drag loads on the wheel and therefore such Tyvek bags of expanded glass beads were deemed unpractical. This type of containment was not assessed further.

2. Rigid Acrylic Sheets

EMAS beds of loose Viceroy beads enclosed in acrylic boxes were tested and the results are summarized in rows M through Q of Table I. Several configurations were assessed:
  A. Single or double vertical walls (to assess if boxes could be made separately or would need to be assembled on-site);
  B. 1/16" or 1/8" thick acrylic for the lid; and
  C. No gap or 4" gap (ullage) between the beads and the lid.

A number of conclusions drawn from the experiment test data are summarized below:
  A. The effect on drag pressure of a gap or no gap between the beads and lid was very small. This result indicates that lids can rest directly on the beads, simplifying design for foot traffic and fire equipment operation on top of the EMAS;
  B. The use of baffles in the containment cells appears to induce some vertical load spikes, with especially high load spikes for the test double vertical walls. This result indicates that the limiting the presence of vertical walls inside the boxes will decreases the load spiking and improve the arresting properties of the arresting medium.
  C. Exchanging a 1/16" acrylic lid with a 1/8" acrylic lid provided a small increase in the drag pressure.

D. As the wheel moves through the bed, a large wave of material formed around it.

Example

An embodiment of an aircraft arresting system according to the invention consists of polymeric containers enclosing glass beads to a nominal height of about two feet deep. The containers are about four feet wide by about six feet long by about two feet deep, and approximately 3,400 containers would be required for a 400 foot by 200 foot arrestor system. Material costs for the arrestor system are estimated to be on the order of $2.5 million for a 400 foot by 200 foot system. Costs for site-specific design and installation are estimated to be on the order of $2.0 million after site preparation is complete.

While the invention has been particularly shown and described with reference to particular embodiments, those skilled in the art will understand that various changes in form and details may be made without departing from the spirit and scope of the invention.

What is claimed is:

1. An aircraft arrestor system comprising:
   an arresting medium comprising smooth and rounded expanded glass particles which are loose and unbroken and have an outer surface devoid of angular corners, wherein the particles have a controlled size range of about 0.04 inches to about 0.75 inches, an average diameter in the range of about 0.4 inches to about 0.5 inches, and at least about 75% of the particles have a minimum size which is not less than about ¼ of the size of the largest particles; and
   a plurality of adjacent containment cells for containing the arresting medium, each containment cell having side walls and a removable lid, wherein the containment cells are frangible and structurally configured to fail during an overrun event, and wherein one or more side walls of selected containment cells contain openings to reduce presented vertical wall area and to increase frangibility and flow of the arresting medium between cells during the overrun event.

2. The aircraft arrestor system according to claim 1, wherein the particles of the arresting medium have an average diameter of about 0.42 inches, and the arresting medium flows when uncontained and exhibits a lack of intrinsic interlock or settling over time.

3. The aircraft arrestor system according to claim 1, wherein the containment cells have a depth of about 18 inches to about 40 inches.

4. The aircraft arrestor system according to claim 1, wherein the containment cells have about 0-20% ullage after being filled with the arresting medium.

5. The aircraft arrestor system according to claim 1, wherein the walls of the containment cells are about 4 feet to about 12 feet apart.

6. The aircraft arrestor system according to claim 1, wherein the lids are attached to the cells using a snap-on connector.

7. The aircraft arrestor system according to claim 1, wherein the containment cells are in the form of boxes, troughs, half-troughs, or combinations thereof.

8. The aircraft arrestor system according to claim 1, wherein the containment cells are in the form of built-up component-and-connector cells which share vertical walls among cells.

9. The aircraft arrestor system according to claim 1, wherein the side walls of the containment cells are affixed to underlying pavement or ground to prevent their movement.

10. The aircraft arrestor system according to claim 1, further comprising a sloping entrance ramp to allow smooth entry of the aircraft onto the surface of the arrestor system during the overrun event, and wherein the containment cells comprise a drainage system to prevent water retention.

11. The aircraft arrestor system according to claim 1, wherein the side walls of the containment cells are formed from acrylic, talc-filled polypropylene, polyvinyl chloride, fiberglass, or a combination thereof.

12. The aircraft arrestor system according to claim 1, wherein the lids are vented.

13. The aircraft arrestor system according to claim 1, wherein the system is structurally configured to stop an aircraft travelling at a speed of about 40-70 knots.

14. The aircraft arrestor system according to claim 1, wherein the system has the following approximate dimensions:

| | |
|---|---|
| Bed depth | about 18 in.-about 40 in. |
| Bed width | about 150 ft.-about 250 ft. |
| Bed length | about 100 ft.-about 1000 ft. |
| Lid thickness | about 1/16 in.-about ½ in. |
| Wall thickness | about 1/16 in.-about ½ in. |
| Ullage | about 0 in.-about 6 in., or about 0%-about 20% of bed height. |

15. The aircraft arrestor system according to claim 14, wherein the lids have ribs having the following approximate dimensions:

| | |
|---|---|
| Rib thickness | about 1/16 in.-about ½ in. |
| Rib height | about 2 in.-about 6 in. |
| Rib spacing | about 3 in.-about 12 in. |

\* \* \* \* \*